US012592094B2

(12) United States Patent
Shang et al.

(10) Patent No.: US 12,592,094 B2
(45) Date of Patent: Mar. 31, 2026

(54) METHODS AND SYSTEMS OF AUTOMATICALLY ASSOCIATING TEXT AND CONTROL OBJECTS

(71) Applicant: MICRO FOCUS LLC, Santa Clara, CA (US)

(72) Inventors: Er-Xin Shang, Shanghai (CN); Shuhui Fu, Shanghai (CN); Yi-Bin Guo, Shanghai (CN); Niv Lederer, Yehud (IL)

(73) Assignee: Micro Focus LLC, Santa Clara, CA (US)

( * ) Notice: Subject to any disclaimer, the term of this patent is extended or adjusted under 35 U.S.C. 154(b) by 837 days.

(21) Appl. No.: 17/471,633

(22) Filed: Sep. 10, 2021

(65) Prior Publication Data

US 2023/0078782 A1    Mar. 16, 2023

(51) Int. Cl.
*G06V 30/14*        (2022.01)
*G06F 3/04842*     (2022.01)
*G06N 3/02*         (2006.01)

(52) U.S. Cl.
CPC ...... *G06V 30/1444* (2022.01); *G06F 3/04842* (2013.01); *G06N 3/02* (2013.01)

(58) Field of Classification Search
CPC .. G06V 30/1444; G06V 10/82; G06V 30/413; G06V 30/10; G06F 3/04842; G06F 3/0481; G06N 3/02; G06N 3/0464
See application file for complete search history.

(56) References Cited

U.S. PATENT DOCUMENTS

2013/0063423 A1*    3/2013   Hsu ..................... G06F 3/04842
                                                                    345/419
2018/0189170 A1*    7/2018   Dwarakanath ....... G06V 30/153

OTHER PUBLICATIONS

Huang, Jianjun, et al. "{SUPOR}: Precise and scalable sensitive user input detection for android apps." 24th USENIX Security Symposium (USENIX Security 15). 2015. (Year: 2015).*
Zhang, Zhen, Bin He, and Kevin Chen-Chuan Chang. "Understanding web query interfaces: Best-effort parsing with hidden syntax." Proceedings of the 2004 ACM SIGMOD international conference on Management of data. 2004. (Year: 2004).*

* cited by examiner

*Primary Examiner* — Leon Viet Q Nguyen
(74) *Attorney, Agent, or Firm* — Sheridan Ross P.C.

(57)        ABSTRACT

Systems and methods of associating text with a graphical user interface (GUI) object are disclosed. Disclosed systems and methods include identifying a GUI object and a text string. A positional relationship between the GUI object and the text string is determined. Based on the positional relationship between the GUI object and the text string, a map with an indication associating the GUI object with the text string is updated.

20 Claims, 15 Drawing Sheets

METHODS AND SYSTEMS OF AUTOMATICALLY ASSOCIATING TEXT AND CONTROL OBJECTS

FIELD

The present disclosure relates generally to image processing and more particularly to automatically detecting control object text association.

BACKGROUND

With the advancement of technology, the use and popularity of electronic devices has increased considerably. Electronic devices are commonly used to capture and process image data. Electronic devices such as computers are used to automate tasks in such a way as to perform the tasks faster and more accurately than humanly possible. As such, the computer has become not a tool used to replicate human tasks but a machine capable of performing feats no human could possibly perform.

To perform some computer tasks, a processor or processors of a computer may be required to process visual information. For example, a computer may receive an image and be configured to sort the image based on contents of the image. Similarly, a computer may perform a task of digitizing books or other written material by executing an Optical Character Recognition (OCR) function. Some computers are also programmed to auto-complete forms in Internet pages by inputting data.

Conventional computer-implemented methods of analyzing image data are inefficient in many ways and result in errors. For example, methods and interfaces for interpreting environments that include at least some visual elements such as user interfaces may be capable of reading text but are not capable of understanding the user interface in other ways. Described herein are technological improvements to such systems, among other things.

BRIEF DESCRIPTION OF THE DRAWINGS

For a more complete understanding of the present disclosure, reference is now made to the following description taken in conjunction with the accompanying drawings.

Figure 1:
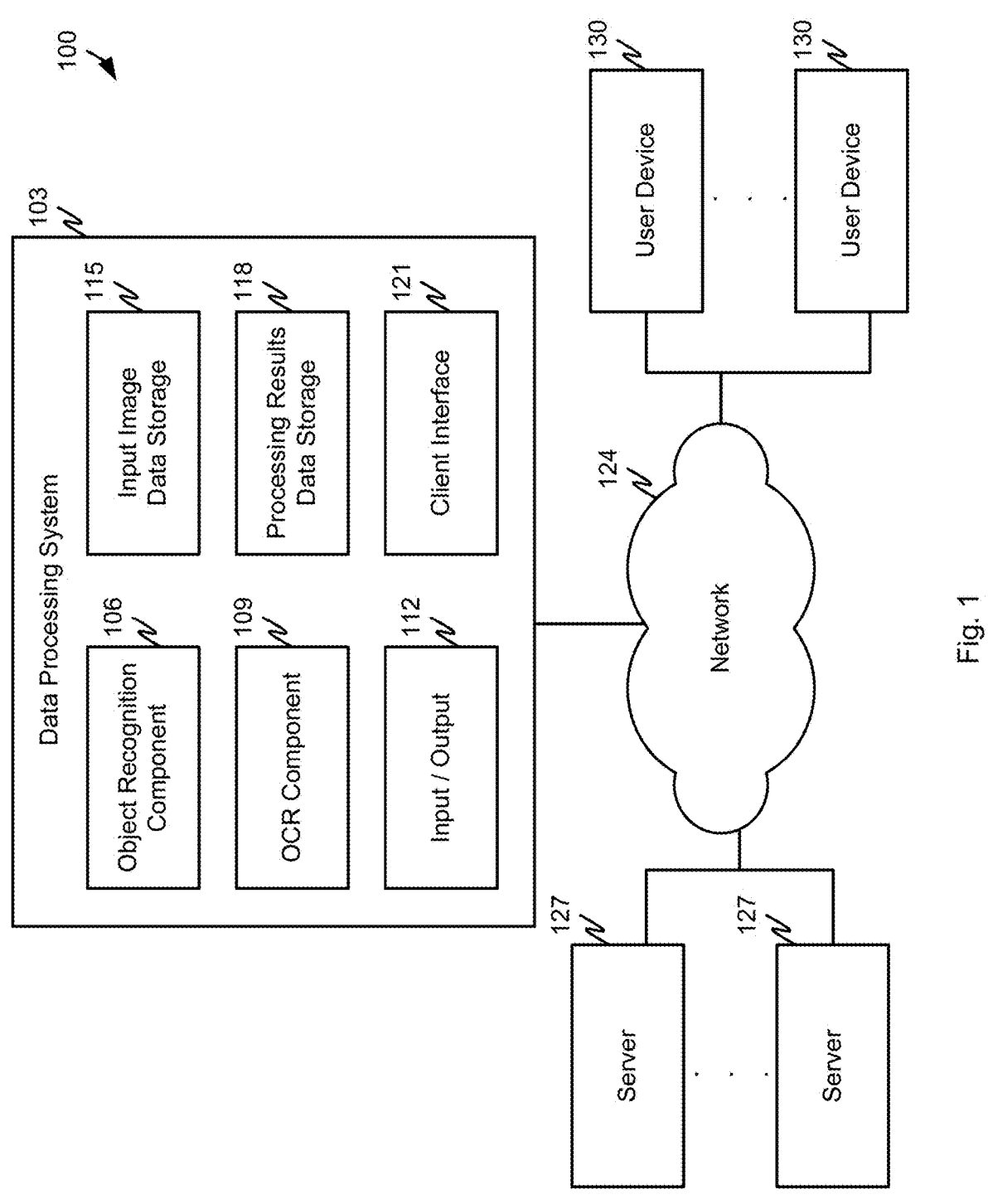
FIG. 1 illustrates an example computing environment according to embodiments of the present disclosure.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

As described above, methods and interfaces for interpreting environments that include at least some visual elements such as user interfaces may be capable of reading text but are not capable of understanding the user interface in other ways.

These and other needs are addressed by the various embodiments and configurations of the present disclosure.

As disclosed herein, a computer system may be configured to process image data including images of user interfaces, identify text and control objects, and associate the text and control objects. Such a system or method may be used to enable the computer system to perform functions such as auto-complete or to build tutorials automatically to teach humans who have never seen such user interfaces how to use such user interfaces. Such a system or method may also be used to change languages of user interfaces and to reorganize or recreate a user interface in another way.

The present disclosure can provide a number of advantages depending on the particular configuration. These and other advantages will be apparent from the disclosure contained herein.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a," "an," "one or more" and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but should not be considered as limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random-access memory (RAM), a read-only memory (ROM), an erasable programmable read-only memory (EPROM or Flash memory), an optical fiber, a portable compact-disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including but not limited to wireless, wireline, optical fiber cable, RF, etc., or any suitable combination of the foregoing.

The terms "determine," "calculate," "compute," and variations thereof, as used herein, are used interchangeably, and include any type of methodology, process, mathematical operation, or technique.

The term "means" as used herein shall be given its broadest possible interpretation in accordance with 35 U.S.C. Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

FIG. 1 is a block diagram of an illustrative computing environment 100 for associating text and control objects within an input image. The computing environment 100 comprises one or more user devices 130, a network 124, one or more servers 127, and one or more data processing systems 103. It should be appreciated the systems and methods described herein may be performed using any number or none of one or more of the user devices 130, network 124, and servers 127.

The user devices 130 can be or may include any device that can communicate with the network 124, such as a Personal Computer (PC), a cellular telephone, a Personal Digital Assistant (PDA), a tablet device, a notebook device, a smartphone, and/or the like. Although two communication devices 130 are shown in FIG. 1, any number of communication devices could be connected to the network 124. In one embodiment, a user device 130 may not be needed. In this embodiment, a user can access a server 127 or the data processing system 103 directly via a user interface/display that is part of the server 127 or data processing system 103.

The network 124 can be or may include any collection of communication equipment that can send and receive electronic communications, such as the Internet, a Wide Area Network (WAN), a Local Area Network (LAN), a packet switched network, a circuit switched network, a cellular network, a combination of these, and/or the like. The network 124 can use a variety of electronic protocols, such as Ethernet, Internet Protocol (IP), Hyper Text Markup Language (HTML), Hyper Text Transfer Protocol (HTTP), Web Real-Time Protocol (Web RTC), and/or the like. Thus, the network 124 is an electronic communication network configured to carry messages via packets and/or circuit switched communications.

The server 127 can be or may include any hardware coupled with software that can run containerized services, such as, a web service, a cloud service, a network service, a security service, a database service, a network management service, and/or the like. The server 127 may comprise one or more containers, an operating system, one or more processors and/or microprocessors, and/or a software/hardware manager.

A data processing system 103 can be or may include any type of computing device capable of performing the systems and methods as described herein. In some embodiments, the data processing system 103 may be a software-implemented system or a separate computing system.

The data processing system may in some embodiments include a control object recognition component 106. A control object recognition component 106 may comprise an artificial intelligence system capable of analyzing image data and outputting data indicating whether any control objects are found in the image data. For example, the control object recognition component 106 may output a list of all control objects found within the image data. The list of control objects may comprise data such as a position of each control object, a size of each control object, a type or estimated type of each control object, and/or other information.

The data processing system may in some embodiments include an OCR component 109. An OCR component 109 may in some embodiments be an application or service configured to identify text within image data. In some embodiments, the OCR component 109 may be configured to identify blocks or fields of text. For example, the OCR component 109 may be configured to determine whether two characters of text are part of a same sentence or phrase. Such a determination may be made based on a detected separation of the characters. The OCR component 109 may be configured to output an indication of locations of text, size of text, and other information for a given input image.

The data processing system may in some embodiments include one or more input and/or output components 112. Input components 112 may comprise a keyboard or other text input system, a touch screen, mouse, camera, microphone, etc. Output components 112 may comprise speakers, display devices, etc.

The data processing system may in some embodiments include an input image data storage system 115. An input image data storage system 115 may be a set of memory within the data processing system or may be a data location available to the data processing system, such as stored in a network location. The input image data storage system 115 may be configured to store input images which are to be used for processing in memory so that the input images are available when needed.

The data processing system may in some embodiments include a processing results data storage system 118. Similar to the input image data storage system 115, the processing results data storage system 118 may be a set of memory within the data processing system or may be a data location available to the data processing system, such as stored in a network location. The processing results data storage system 118 may be configured to store results of processing, which may be in the form of text or other types of data, in memory so that the input images are available when needed.

The data processing system 103 may in some embodiments include a client interface 121. A client interface 121 may be configured to enable a user to access data stored by and/or available to the data processing system and to edit user settings or make other changes to the data processing system.

Figure 2:
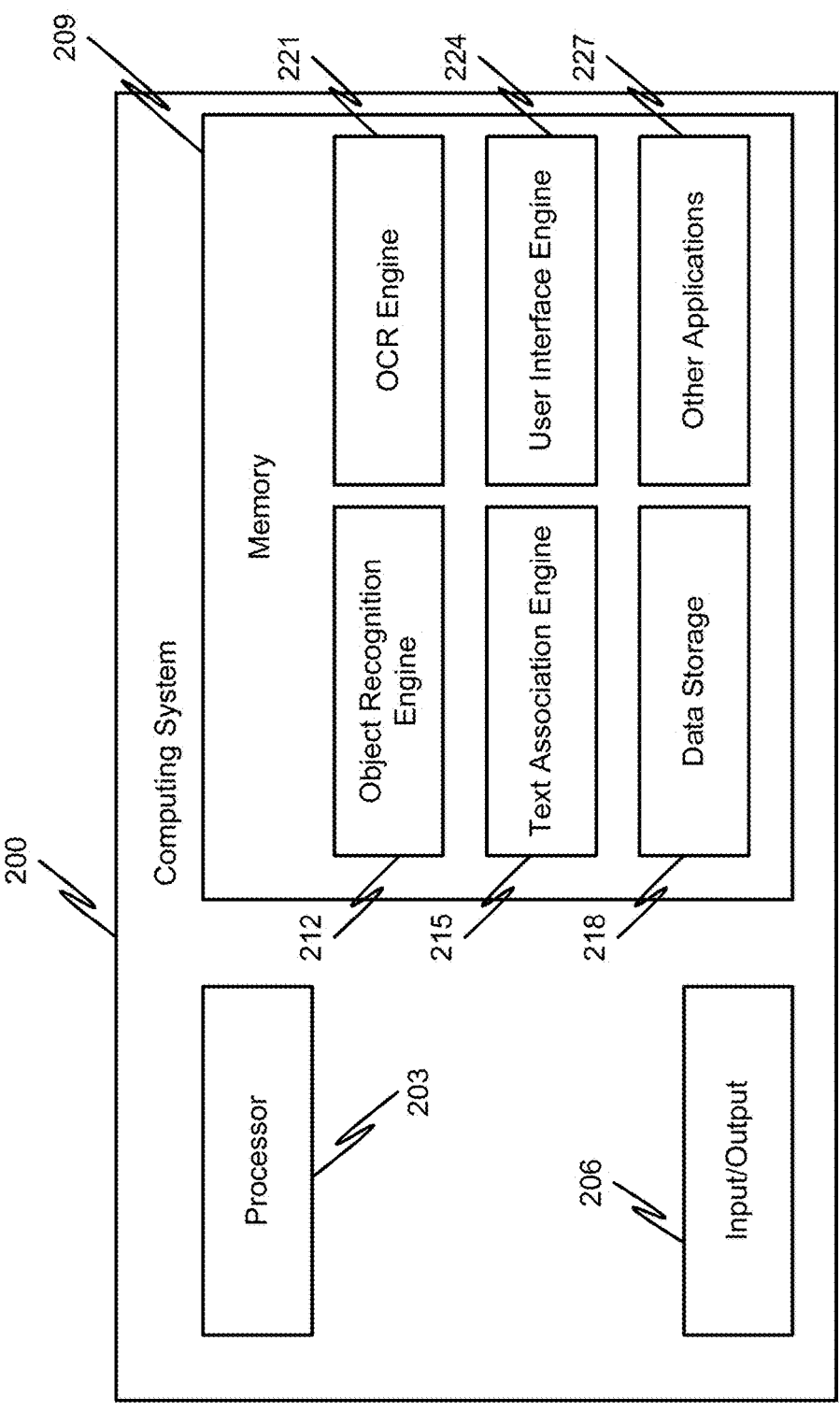
FIG. 2 illustrates an example computing system according to embodiments of the present disclosure.

The data processing system 103 as described above in relation to FIG. 1 may be a computing device 200 as illustrated in FIG. 2.

FIG. 2 depicts a computing system 200 in accordance with embodiments of the present disclosure. The computing system 200 performs text and object recognition in accordance with the embodiments disclosed herein. The computing system receives image data for processing. For example, the computing system 200 may be configured to receive one or more input images from a user and/or may be operable to poll network locations, such as via the Internet, to capture images for processing. The computing system 200 may store any image data and/or other data in a computer memory storage system 209. Similar computing systems may be included in devices 130 and/or servers 127 as illustrated in FIG. 1, in whole or in part, described herein to perform the automatic testing of a webpage layout.

The computing system 200 illustrated in FIG. 2 is representative of any computing system or systems with which the various operational architectures, processes, scenarios, and sequences disclosed herein to perform the automatic identification of text and control objects and the association of text and control objects within images.

The computing system 200 may comprise a number of input/output systems 206 such as a communication interface and/or a user interface system. The computing system 200 may also comprise one or more processors 203 or a processing system of another form. The processor 203 may be linked to the input/output systems 206 as well as memory 209 of the computing system 200. The processing system may include a microprocessor and/or processing circuitry and may be in communication with the memory 209. The memory 209 may store operating software and application data. The computing system 200 may in some embodiments include other well-known components such as a battery and enclosure that are not shown for clarity. The computing system 200 may be in the form of a server, a user device, a desktop computer, a laptop computer, a tablet computing device, or some other user communication apparatus.

The input/output system 206 may comprise a communication interface comprising components that communicate over communication links, such as network cards, ports, radio frequency (RF), processing circuitry and software, or some other communication devices. A communication interface may be configured to communicate over metallic, wireless, or optical links. A communication interface may be configured to use Time Division Multiplex (TDM), Internet Protocol (IP), Ethernet, optical networking, wireless protocols, communication signaling, or some other communication format—including combinations thereof. In some implementations, a communication interface is configured to communicate with other devices external to the computing system 200.

The input/output systems 206 may comprise components configured to interact with a user to display images and receive input from the user. The input/output systems 206 may include a speaker, microphone, buttons, lights, display screen, touch screen, touch pad, scroll wheel, communication port, or some other user input/output apparatus—including combinations thereof.

The processing circuitry of the computing system 200 may be embodied as a single electronic microprocessor or multiprocessor device (e.g., multicore) having therein components such as control unit(s), input/output unit(s), arithmetic logic unit(s), register(s), primary memory, and/or other components that access information (e.g., data, instructions, etc.), such as received via a bus, executes instructions, and outputs data, again such as via the bus. In other embodiments, the processing circuitry may comprise a shared processing device that may be utilized by other processes and/or process owners, such as in a processing array or distributed processing system (e.g., "cloud," farm, etc.). It should be appreciated that the processing circuitry may be a non-transitory computing device (e.g., electronic machine comprising circuitry and connections to communicate with other components and devices). The processing circuitry may operate a virtual processor, such as to process machine instructions not native to the processor (e.g., translate Intel® chipset code to emulate a different processor's chipset or a non-native operating system, such as a VAX operating system on a Mac), however, such virtual processors are applications executed by the underlying processor and the hardware and other circuitry thereof.

The processing circuitry in some embodiments comprises a microprocessor and other circuitry that retrieves and executes the operating software from the storage system. The storage system may include volatile and nonvolatile, removable, and non-removable media implemented in any method or technology for storage of information, such as computer readable instructions, data structures, program modules, or other data. The storage system may be implemented as a single storage device but may also be implemented across multiple storage devices or sub-systems. The storage system may comprise additional elements, such as a controller to read the operating software. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory however it should be understood that in no case is the storage media a propagated signal.

The processor 203 may be mounted on a circuit board that may also hold the memory 209 and portions of input/output systems 206. The operating software stored within the memory 209 may comprise computer programs, firmware, or some other form of machine-readable program instructions. For example, the memory 209 may comprise an object recognition engine 212, a text association engine 215, data storage 218, an OCR engine 221, a user interface engine 224, and/or one or more other applications 227.

An object recognition engine 212 may in some embodiments comprise an application configured to identify control objects within an input image. As described herein, a control object may comprise a visual aspect of a user interface. Control objects may be used in windows of applications, websites, dialog boxes, etc. Some control objects may be configured to display information and/or enable a user to input data.

Control objects may comprise graphical user interface (GUI) elements configured to be displayed on user devices. Example control objects include, but are not limited to, text entry boxes, text fields, push buttons, radio buttons, check boxes, drop-down list boxes, selection boxes, scroll bars, group boxes, etc.

In some embodiments, the object recognition engine 212 may be an artificial intelligence system which may be trained to identify control objects given an input image. Identifying a control object may comprise determining a type, size, and location of the control object. For example, the object recognition engine 212 may be configured to identify a control object, determine the control object is one of a text entry box, text field, push button, radio button, check box, drop-down list box, selection box, scroll bar, group box, etc., determine a size of the control object, such as by length and width, and determine a location of the control object within the input image, such as by a coordinate on, for example, an x-y coordinate system.

An optical character recognition (OCR) engine 221 may in some embodiments comprise an application configured to identify text within an image. In some embodiments, a trained artificial intelligence system, such as a convolutional neural network, trained to recognize text may be used. The OCR engine 221 may also be configured to identify blocks or groups of text in addition to recognizing characters of text.

As described in greater detail below, a text association engine 215 may be configured to determine whether a group or block of text identified within an image using the OCR engine 221 is associated with one or more control objects identified within the image using the object recognition engine 212. A given image, such as a screenshot of a user interface, may contain a plurality of groups of text and control objects. Using a text association engine 215 as described herein, a mapping or list indicating which text is associated with which control object may be automatically generated and/or updated.

A data storage 218 of a computing system 200 may comprise memory available to each of the engines described above or other applications executed by the computing system 200. For example, the data storage 218 may store input images as received or gathered by the computing system 200 or other applications and may store any other types of data which may be necessary for the execution of the methods described herein.

Figure 7A:
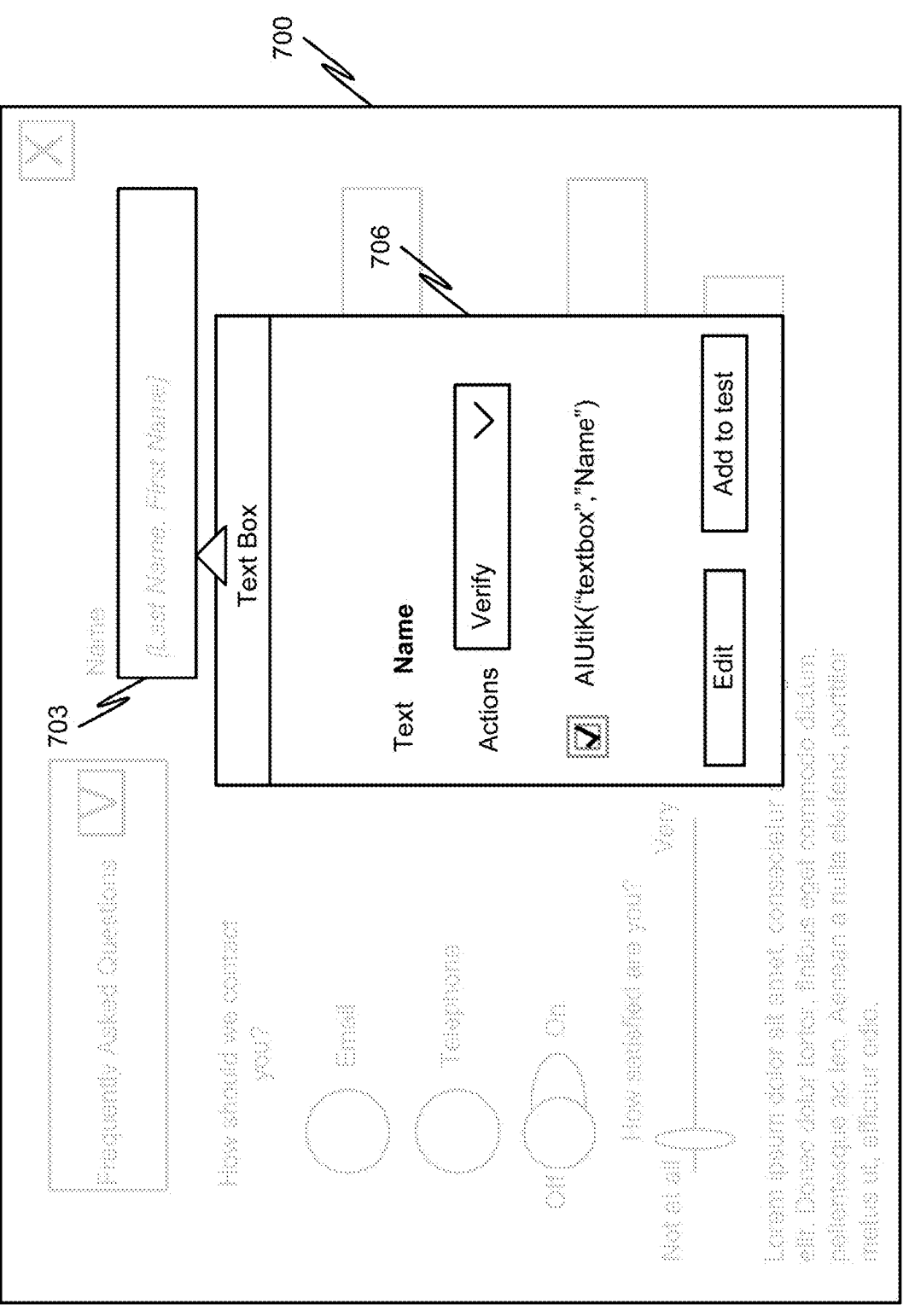
FIGS. 7A-7C illustrate example user interfaces according to embodiments of the present disclosure.
Figure 7B:
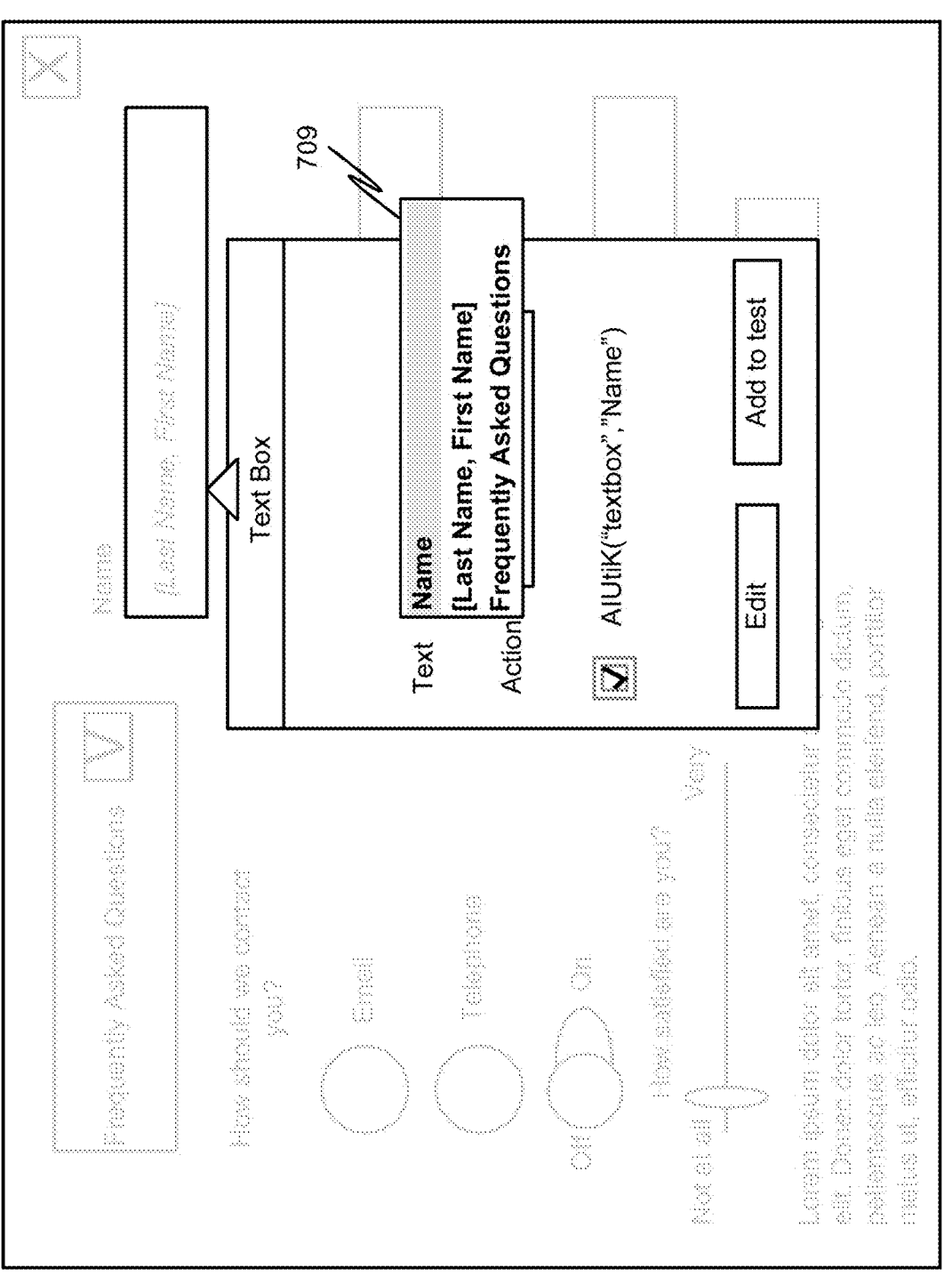
Figure 7C:
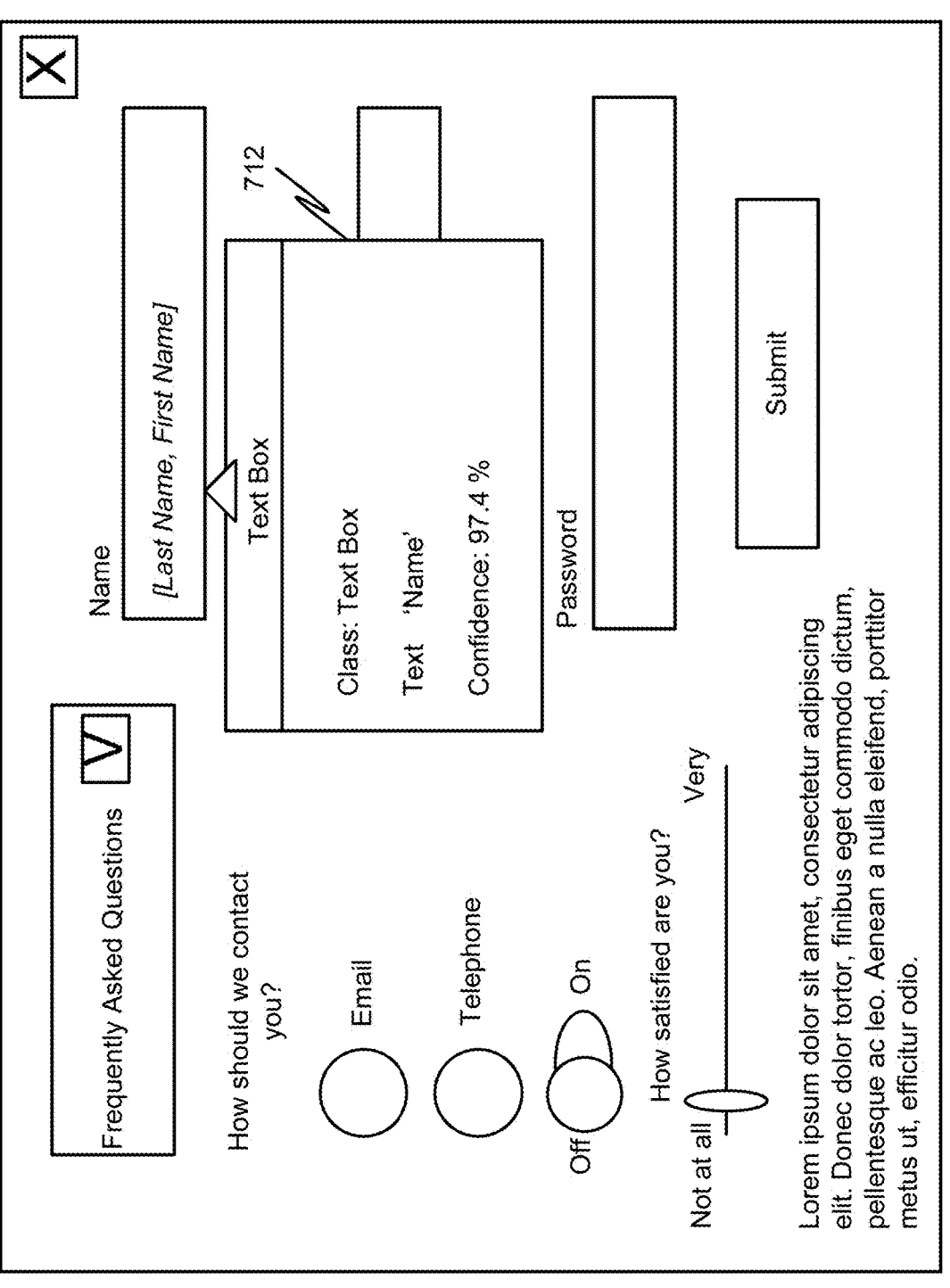

A user interface engine 224 of the computing system 200 may be configured to generate a user interface to be displayed on a display device. The user interface may be as illustrated in FIGS. 7A-7C as described below.

Other applications stored within memory 209 may include an operating system, utilities, drivers, network interfaces, applications, or some other type of software. When executed by the processor 203, operating software may direct the processor 203 to operate the computing device 200 as described herein.

The computing system 200 may execute an operating system can be or may include any type of operating system that can support containerized services, such as, a distributed operating system, a network operating system, a multi-tasking operating system, a time-sharing operating system, a general purpose operating system, and embedded operating system, and/or the like. The operating system may be a Microsoft Windows™ operating system, a Linux™ operating system, an Android™ operating system, an Apple™ iOS operating system, and/or the like. The computing system 200 may be a host for a system without using containers and/or for one or more virtual machines. For example, the systems and methods as described herein may be implemented using a virtual machine.

The processor 203 can be any hardware microprocessor that can execute the operating system and other applications, such as, a microcontroller, a multi-core processor, an application specific processor, and/or the like. The processor 203 is used to execute instructions for running the operating system, the applications. The input/output system 206 may also include hardware components, such as network interface cards, graphics processors, video processors, input ports (e.g., USB ports), and/or the like.

Figure 3A:
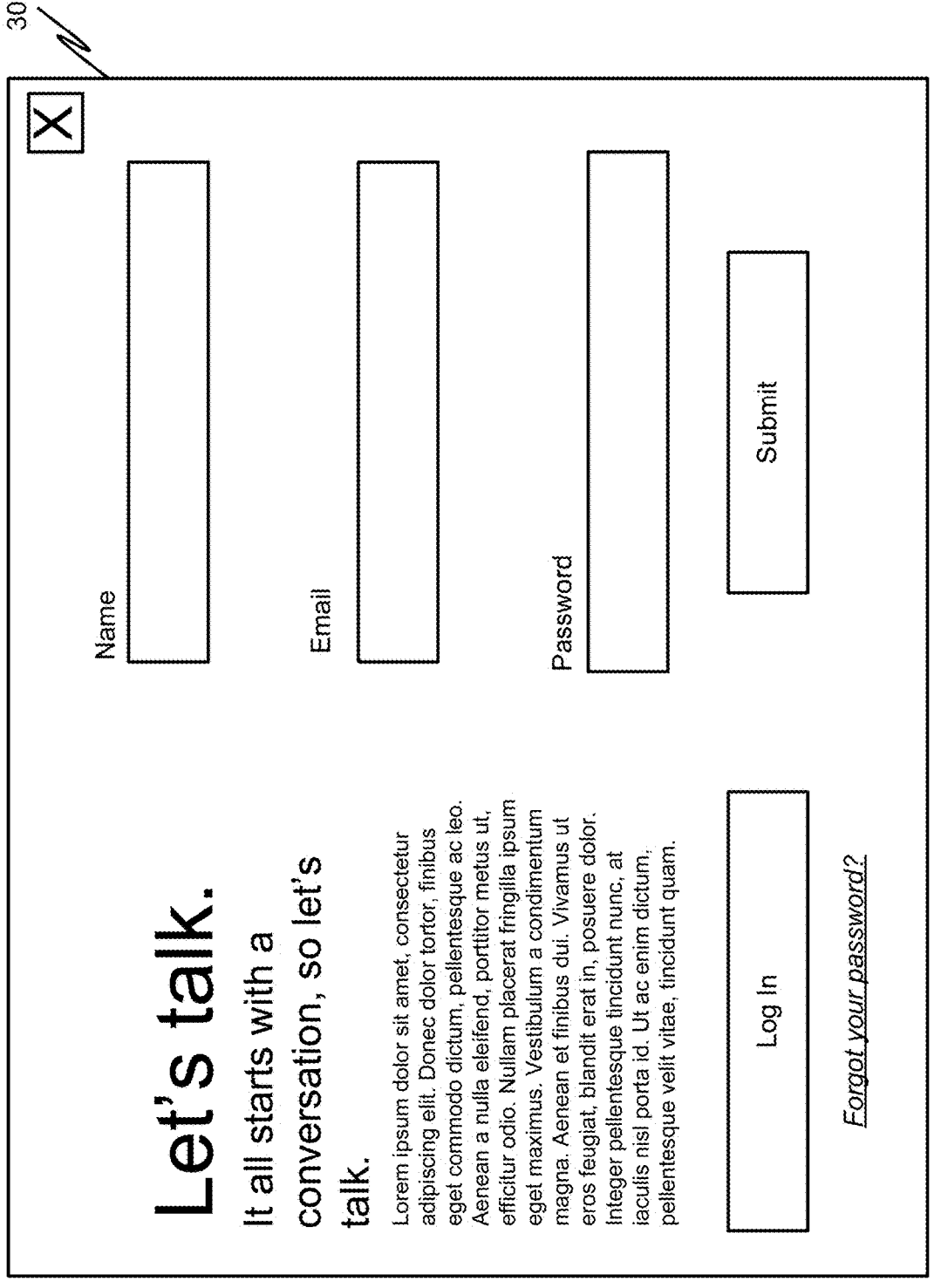
FIG. 3A illustrates an example user interface according to embodiments of the present disclosure.

As illustrated in FIG. 3A, a user interface 300 may comprise an image containing text of various positions and sizes, hyperlinks, labeled buttons, and text entry fields. A user interface 300 may be an image or may be a file configured to be displayed on a display devices, such as an HTML file.

Figure 3B:
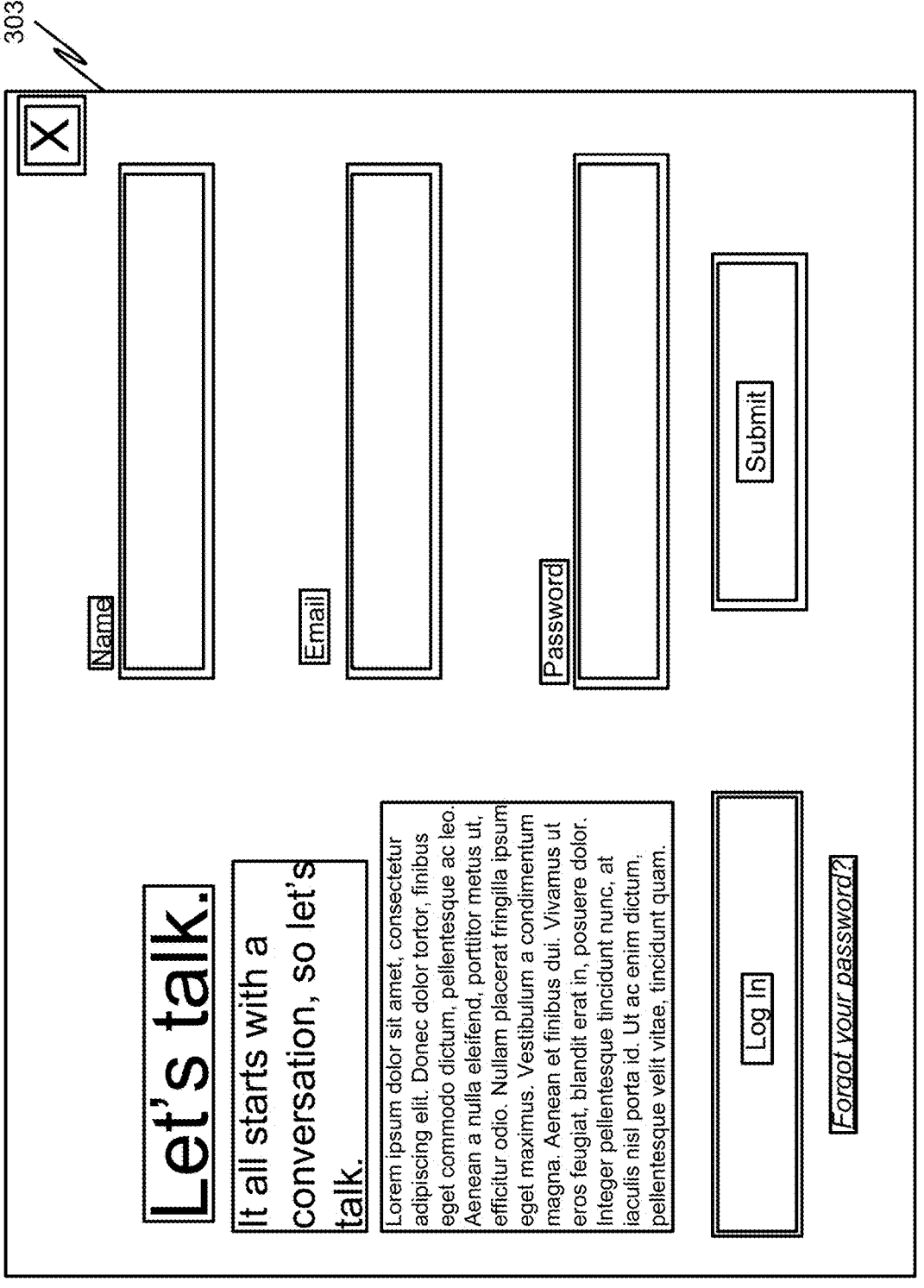
FIG. 3B illustrates an example user interface including bounding boxes according to embodiments of the present disclosure.

As illustrated in FIG. 3B, a user interface 303 which is the same as the user interface 300 as illustrated in FIG. 3A, may be processed by a computing system configured to add or identify bounding boxes highlighting all text fields and control objects. While the bounding boxes of FIG. 3B are visible, it should be appreciated that a computing system may be capable of determining locations of bounding boxes of control objects and/or text fields without necessarily drawing or displaying bounding boxes.

Figure 4:
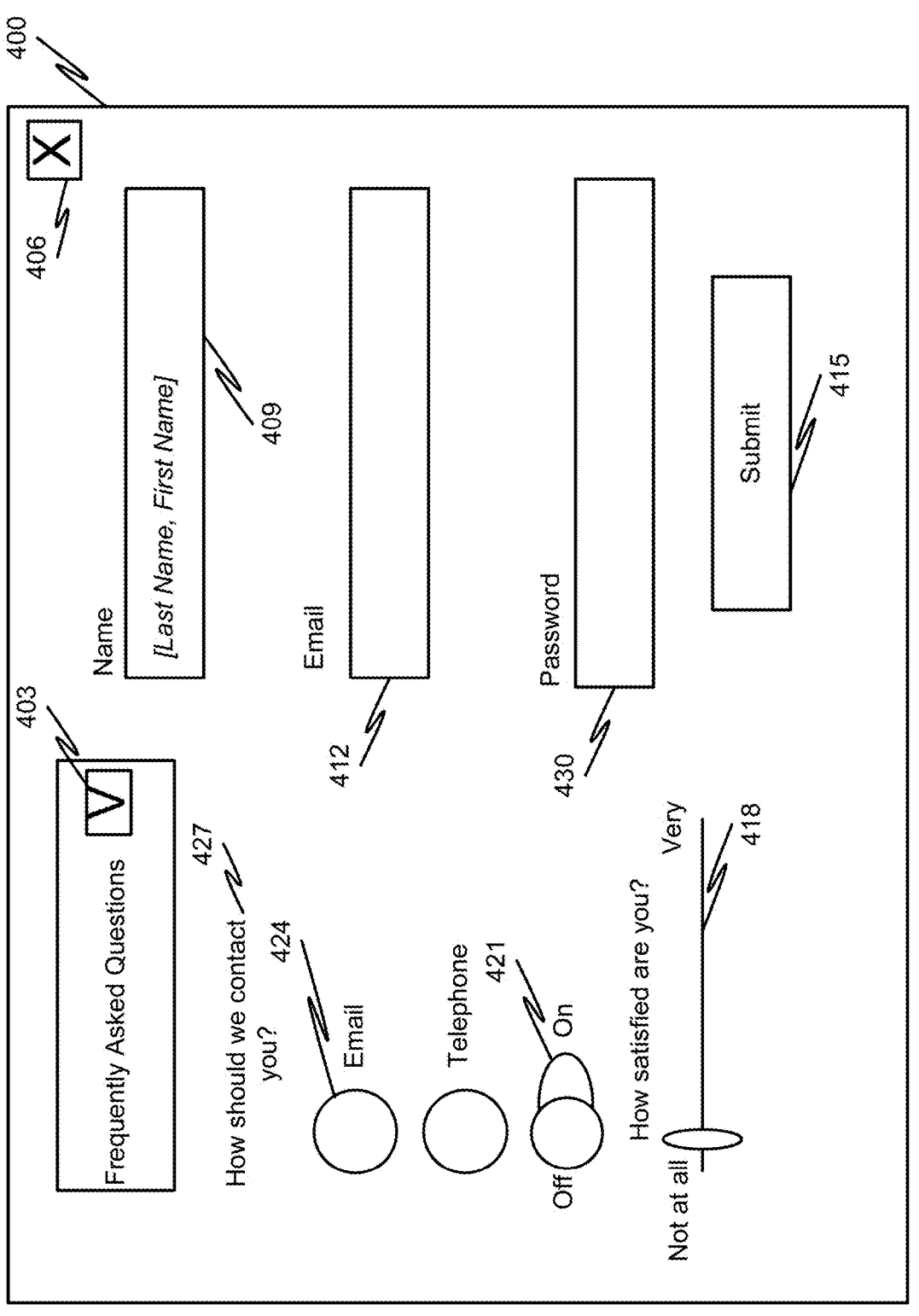
FIG. 4 illustrates an example user interface according to embodiments of the present disclosure.

FIG. 4 is an illustration of a user interface 400 comprising a variety of control objects such as a drop-down menu 403, a close window button 406, a checkbox 424, a switch 421, a slider 418, a labeled text entry field 409, an unlabeled text entry field 412, 430, and a labeled button 415. A user interface 400 may also comprise non-control objects, such as a text field 427.

A drop-down menu 403 may be a type of control object or graphical user interface (GUI) element which would be interactable with by a user. For example, by clicking on the drop-down menu 403 a user may be presented with a set of options. A computing system as described herein may be configured to identify a drop-down menu 403 based only on an image of the drop-down menu. For example, if a rectangle containing a down arrow is found within the image, the computing system may determine the rectangle is a drop-down menu.

A close window button 406 may be a type of control object or graphical user interface (GUI) element which would be interactable with by a user. For example, by clicking a close window button 406, a user may close a displayed user interface containing the close window button 406. A computing system as described herein may be configured to identify a close window button based only on an image of the close window button. For example, if a box with an 'X' is found within the image, the computing system may determine the box with the 'X' is a close window button.

A labeled text entry field 409 may be a type of control object or graphical user interface (GUI) element which would be interactable with by a user. For example, by clicking on a labeled text entry field, the text displayed within the text entry field may be removed and a flashing cursor icon may be displayed. A user may then be enabled to type within the labeled text entry field 409. A computing system as described herein may be configured to identify a labeled text entry field 409 based only on an image of the labeled text entry field 409. For example, if a rectangle containing text is found within the image, the computing system may determine the rectangle containing text is a labeled text entry field 409.

An unlabeled text entry field 412 may be a type of control object or graphical user interface (GUI) element which would be interactable with by a user. For example, by clicking on the unlabeled text entry field 412, a flashing text entry cursor icon may display within the text entry field 412 and a user may be enabled to type within the text entry field 412 A computing system as described herein may be configured to identify an unlabeled text entry field based only on an image of the unlabeled text entry field. For example, if an empty rectangle is found within the image, the computing system may determine the empty rectangle is an unlabeled text entry field.

A labeled button 415 may be a type of control object or graphical user interface (GUI) element which would be interactable with by a user. For example, when a user clicks on a labeled button control object, an action may occur. A computing system as described herein may be configured to identify a labeled button based only on an image of the labeled button. For example, if a rectangle containing text is found within the image, the computing system may determine the rectangle containing text may be a labeled button. In some embodiments, the computing system may determine a rectangle containing text is a labeled button based on the text within the rectangle. For example, if the rectangle contains text comprising a word such as "Continue," "enter," "cancel," etc., the computing system may determine the rectangle containing text is a labeled button.

A slider 418 may be a type of control object or graphical user interface (GUI) element which would be interactable with by a user. For example, by interacting with a slider 418, a user may be enabled to move a portion of the control object along a line. A computing system as described herein may be configured to identify a slider based only on an image of the slider. For example, if a line with a slider is found within the image, the computing system may determine the line with the slider is a slider control object.

A switch 421 may be a type of control object or graphical user interface (GUI) element which would be interactable with by a user. For example, by clicking a switch control object, a user may be enabled to turn a feature on or off, or switch between yes or no, etc. A computing system as described herein may be configured to identify a switch control object based only on an image of the switch. For example, if a switch-looking object is found within the image, the computing system may determine the switch-looking object is a switch.

A checkbox 424 may be a type of control object or graphical user interface (GUI) element which would be interactable with by a user. For example, by clicking a checkbox, a user may be enabled to select or deselect an option. A computing system as described herein may be configured to identify a checkbox based only on an image of the checkbox. For example, if a relatively small box is found within the image, the computing system may determine the box is a checkbox.

A text field 427 may be a field of text and may be a portion of a user interface which is not interactable with by a user, other than that a user may be enabled to select and/or highlight text.

In some embodiments, a computing system may be configured to determine a particular portion of an image is possibly a control object or is a control object of an uncertain type. The computing system may further be configured to determine a percent of certainty as to whether the particular portion of the image is a control object or to whether an identified control object is a control object of a particular type.

In some embodiments, a computing system may be trained to identify control objects and text fields through the use of an artificial intelligence system such as a convolutional neural network. Such an artificial intelligence system may be trained to identify control objects and/or text fields based on example user interfaces.

Figure 5A:
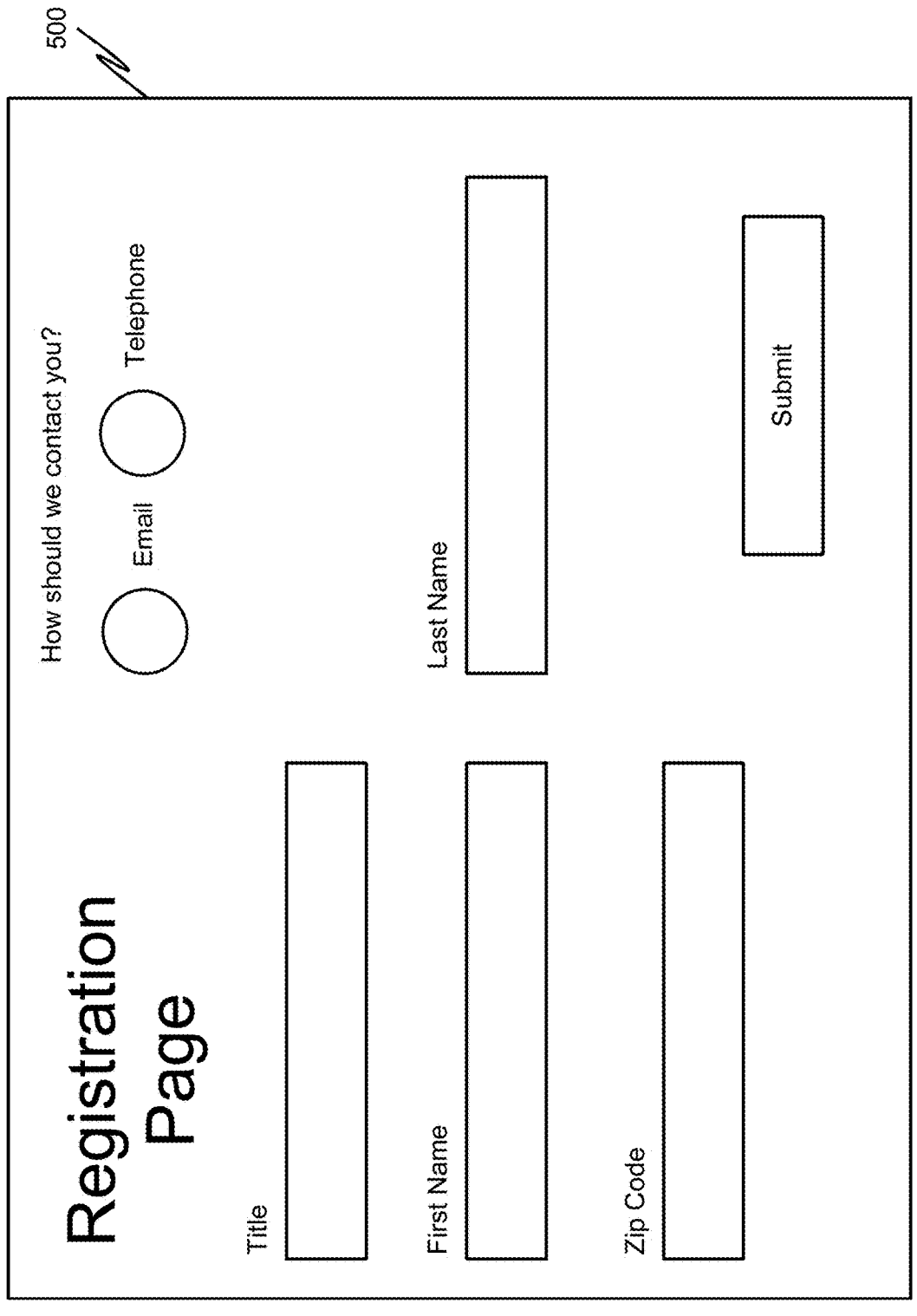
FIG. 5A illustrates an example user interface according to embodiments of the present disclosure.

FIG. 5A is an illustration of a user interface 500. The user interface 500 comprises text fields of "Registration Page," "Title," "First Name," "Last Name," "Zip Code," "Submit," "How should we contact you?," "Email," and "Telephone." The user interface 500 also comprises two checkbox control objects, four text entry control objects, and a button control object. As described below in relation to FIGS. 5B-5E, and the flowchart illustrated in FIG. 8, a computing system may be configured to identify all text and control objects within an image of the user interface 500 and to identify whether each control object is associated with any text and vice versa.

Figure 5B:
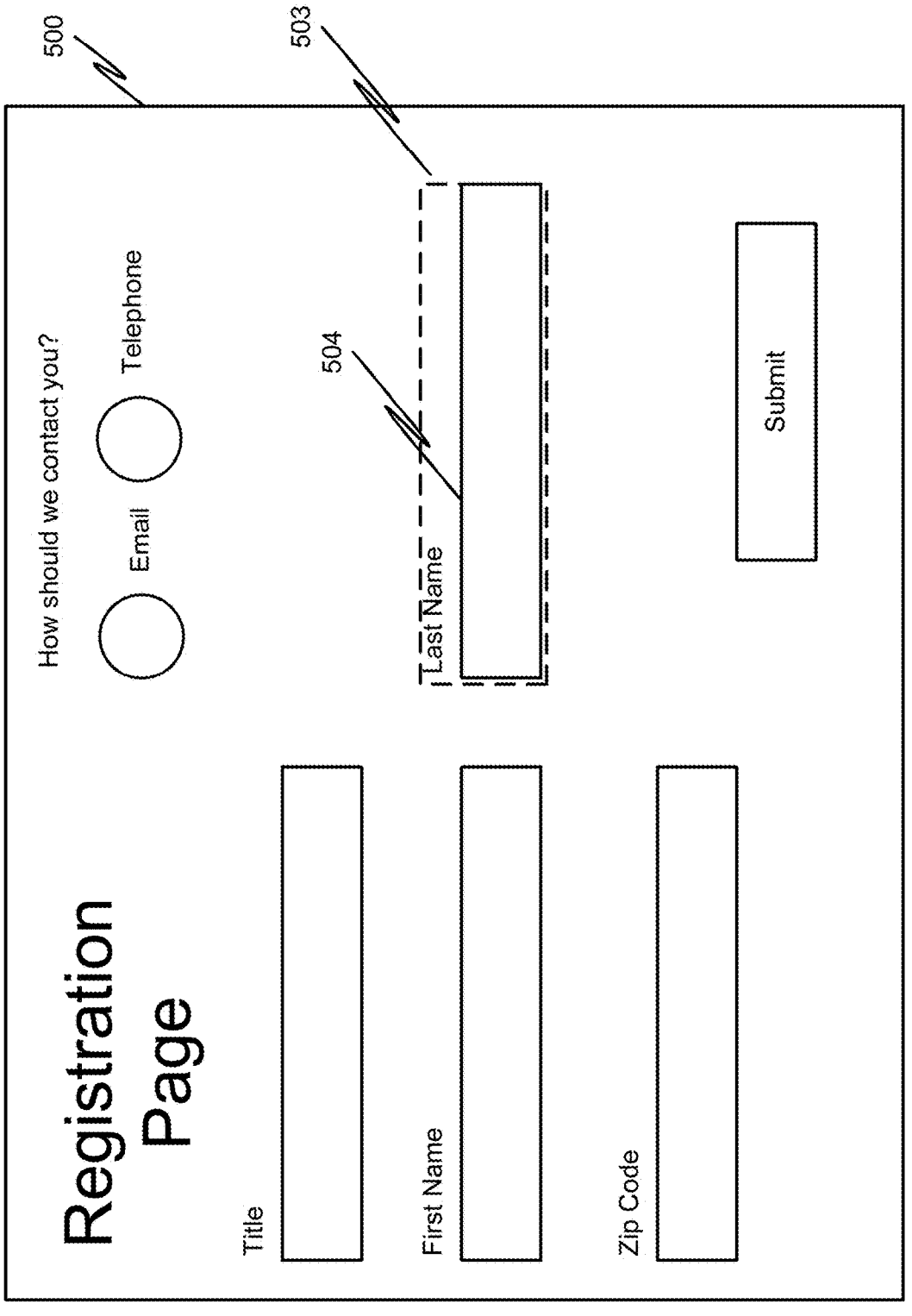
FIGS. 5B-5E illustrate example user interfaces with virtual envelopes according to embodiments of the present disclosure.

FIG. 5B illustrates the user interface 500 with a bottom-right quadrant virtual envelope 503 drawn to encompass the "Last Name" text field and the nearest control object directly below and to the right of the "Last Name" text field, which, in the case of user interface 500, is the text entry control object 504. As described in greater detail below in relation to FIG. 8, the bottom-right quadrant virtual envelope 503 may be drawn by a computing system by aligning a left edge of the bottom-right quadrant virtual envelope 503 with a left edge of a bounding box of the "Last Name" text field and a top edge of the bottom-right quadrant virtual envelope 503 with a top edge of the bounding box of the "Last Name" text field. The bottom-right quadrant virtual envelope 503 may be sized by the computing system such that a right edge of the bottom-right quadrant virtual envelope 503 extends until it reaches a right edge of a bounding box of a control object. In the case of the user interface 500, the right edge of the bottom-right quadrant virtual envelope 503 is drawn by the computing system to align with the right edge of the text entry control object 504. The bottom-right quadrant virtual envelope 503 may also be sized by the computing system such that a bottom edge of the bottom-right quadrant virtual envelope 503 extends until it reaches a bottom edge of a bounding box of a control object. In the case of the user interface 500, the bottom edge of the bottom-right quadrant virtual envelope 503 is drawn by the computing system to align with the bottom edge of the text entry control object 504.

Figure 5C:
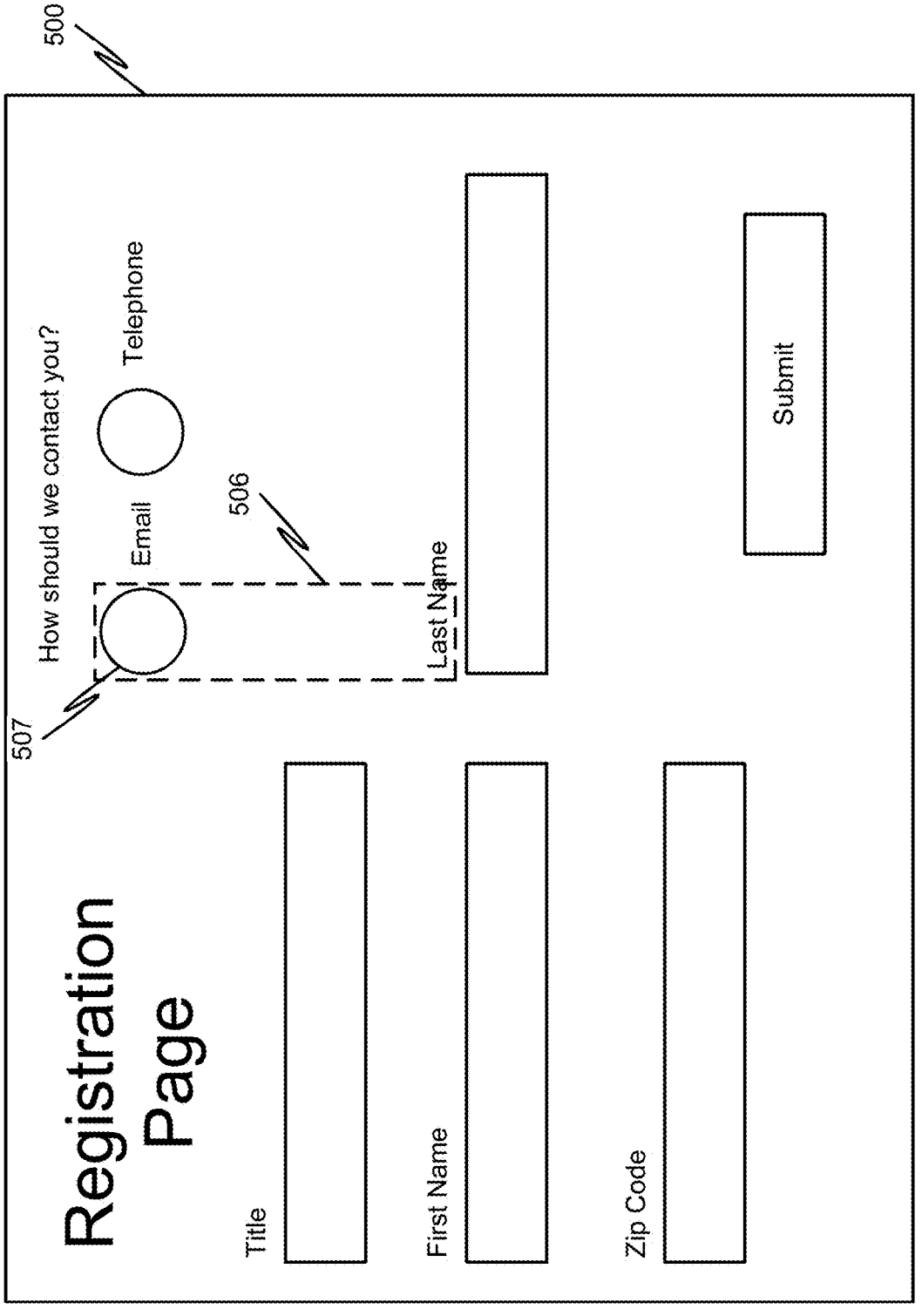

FIG. 5C illustrates the user interface 500 with a top-right quadrant virtual envelope 506 drawn to encompass the "Last Name" text field and the nearest control object directly above and to the right of the "Last Name" text field, which, in the case of user interface 500, is the button control object 507. As described in greater detail below in relation to FIG. 8, the top-right quadrant virtual envelope 506 may be drawn by a computing system by aligning a left edge of the top-right quadrant virtual envelope 506 with a left edge of a bounding box of the "Last Name" text field and a bottom edge of the top-right quadrant virtual envelope 506 with a bottom edge of the bounding box of the "Last Name" text field. The top-right quadrant virtual envelope 506 may be sized by the computing system such that a right edge of the top-right quadrant virtual envelope 506 extends until it reaches a right edge of a bounding box of a control object. In the case of the user interface 500, the right edge of the top-right quadrant virtual envelope 506 is drawn by the computing system to align with the right edge of the button control object 507. The top-right quadrant virtual envelope 506 may also be sized by the computing system such that a top edge of the top-right quadrant virtual envelope 506 extends until it reaches a top edge of a bounding box of a control object. In the case of the user interface 500, the top edge of the top-right quadrant virtual envelope 506 is drawn by the computing system to align with the top edge of the button control object 507.

Figure 5D:
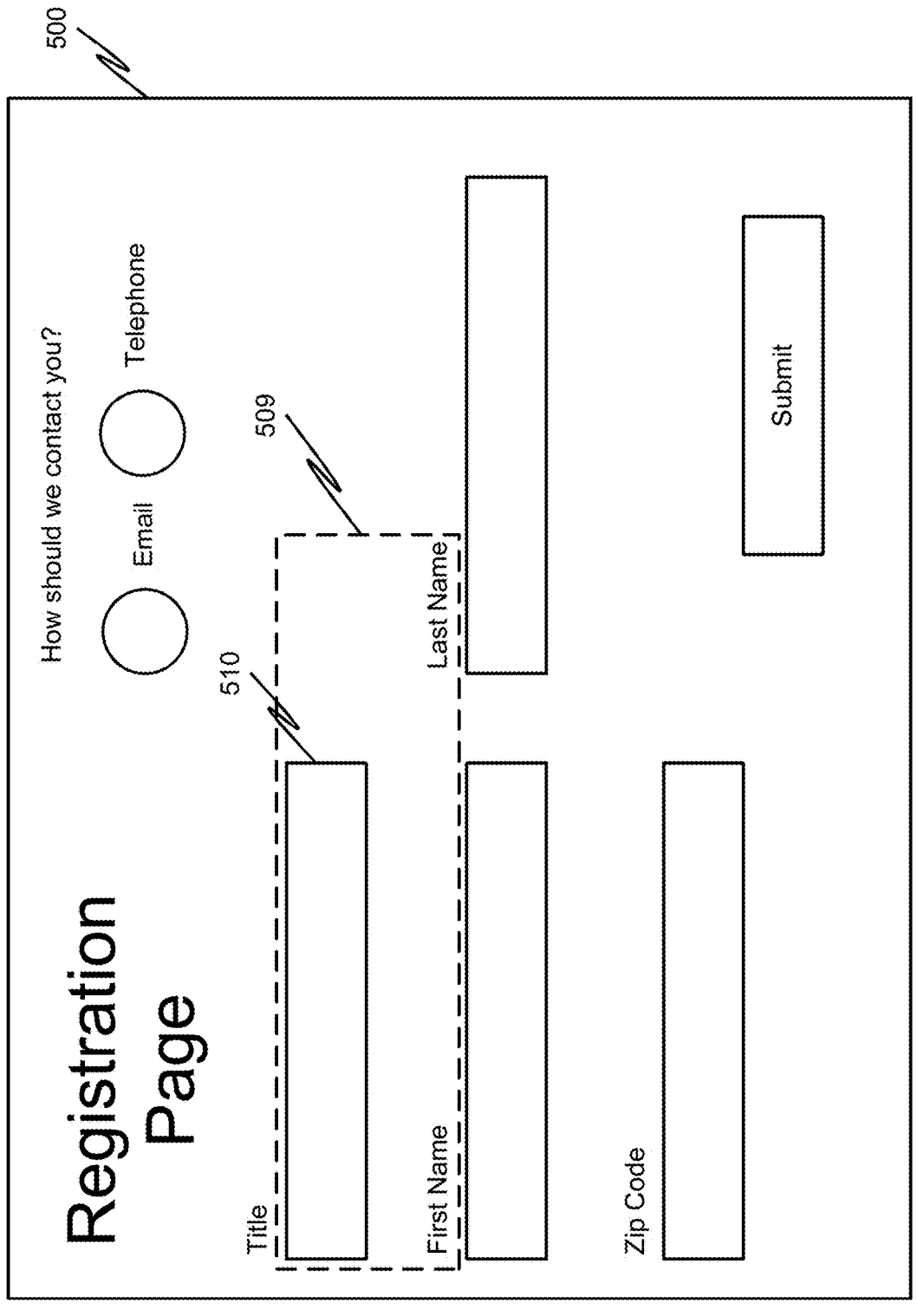

FIG. 5D illustrates the user interface 500 with a top-left quadrant virtual envelope 509 drawn to encompass the "Last Name" text field and the nearest control object directly above and to the left of the "Last Name" text field, which, in the case of user interface 500, is the text entry control object 510. As described in greater detail below in relation to FIG. 8, the top-left quadrant virtual envelope 509 may be drawn by a computing system by aligning a right edge of the top-left quadrant virtual envelope 509 with a right edge of a bounding box of the "Last Name" text field and a bottom edge of the top-left quadrant virtual envelope 509 with a bottom edge of the bounding box of the "Last Name" text field. The top-left quadrant virtual envelope 509 may be sized by the computing system such that a right edge of the top-left quadrant virtual envelope 509 extends until it reaches a left edge of a bounding box of a control object. In the case of the user interface 500, the left edge of the top-left quadrant virtual envelope 509 is drawn by the computing system to align with the left edge of the text entry control object 510. The top-left quadrant virtual envelope 509 may also be sized by the computing system such that a top edge of the top-left quadrant virtual envelope 509 extends until it reaches a top edge of a bounding box of a control object. In the case of the user interface 500, the top edge of the top-left quadrant virtual envelope 509 is drawn by the computing system to align with the top edge of the text entry control object 510.

Figure 5E:
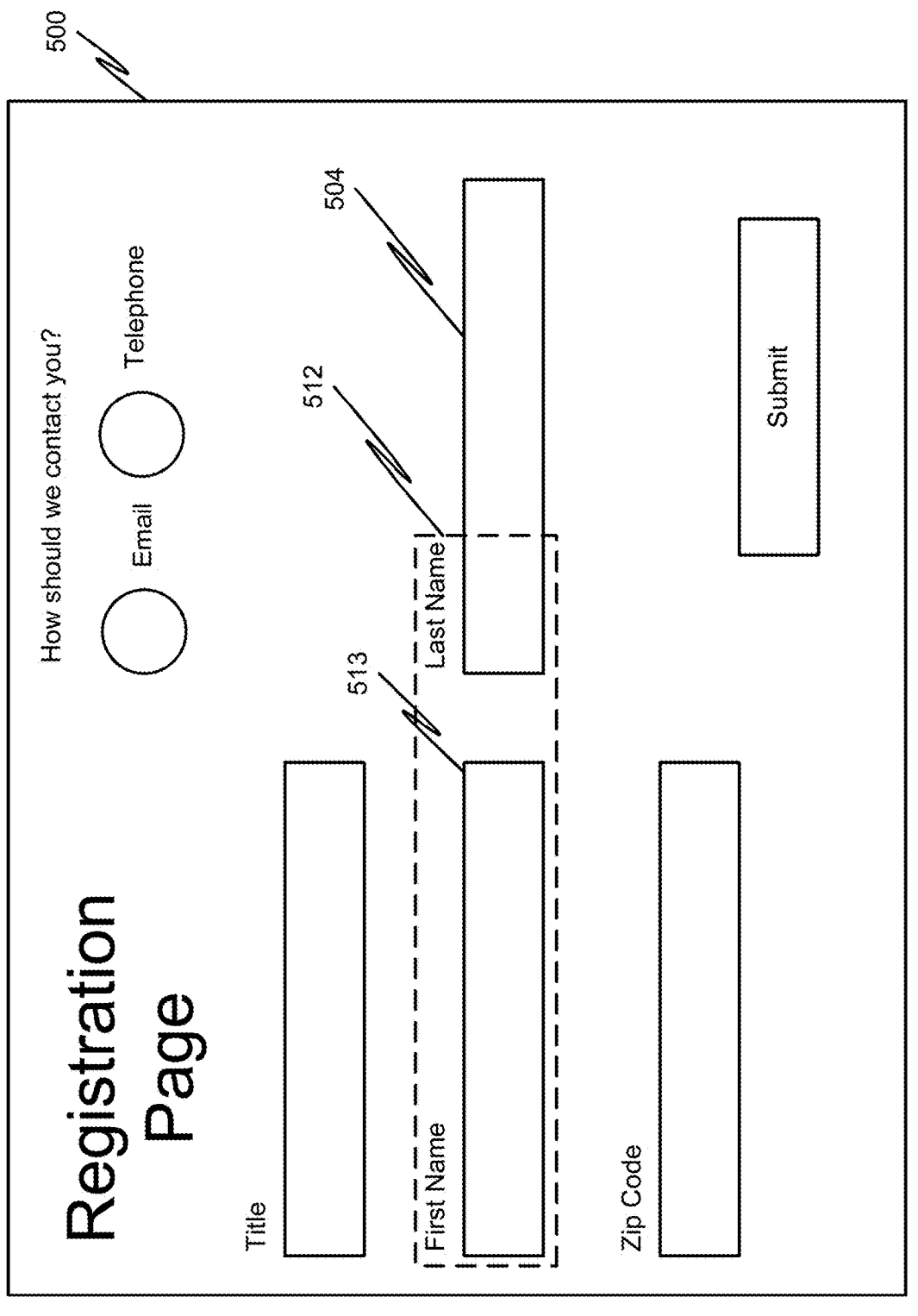

FIG. 5E illustrates the user interface 500 with a bottom-left quadrant virtual envelope 512 drawn to encompass the "Last Name" text field and the nearest control object directly below and to the left of the "Last Name" text field, which, in the case of user interface 500, is the text entry control object 513. As described in greater detail below in relation to FIG. 8, the bottom-right quadrant virtual envelope 512 may be drawn by a computing system by aligning a right edge of the bottom-left quadrant virtual envelope 512 with a right edge of a bounding box of the "Last Name" text field and a top edge of the bottom-left quadrant virtual envelope 512 with a top edge of the bounding box of the "Last Name" text field. The bottom-left quadrant virtual envelope 512 may be sized by the computing system such that a left edge of the bottom-left quadrant virtual envelope 512 extends until it reaches a left edge of a bounding box of a control object. In the case of the user interface 500, the left edge of the bottom-left quadrant virtual envelope 512 is drawn by the computing system to align with the left edge of the text entry control object 513. The bottom-left quadrant virtual envelope 512 may also be sized by the computing system such that a bottom edge of the bottom-left quadrant virtual envelope 512 extends until it reaches a bottom edge of a bounding box of a control object. In the case of the user interface 500, the bottom edge of the bottom-left quadrant virtual envelope 512 is drawn by the computing system to align with the bottom edge of the text entry control object 513.

Figure 6:
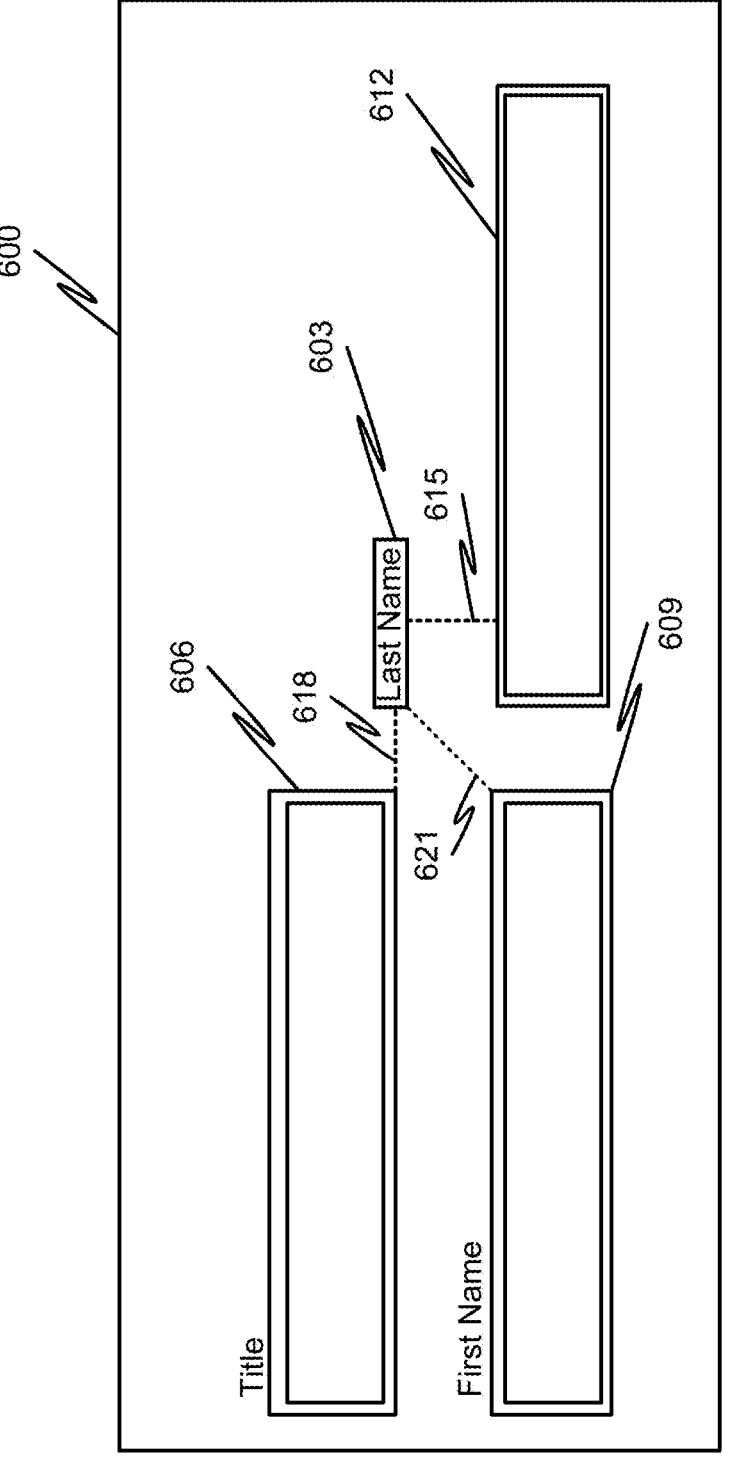
FIG. 6 illustrates an example user interface with distance markings according to embodiments of the present disclosure.

As illustrated in FIG. 6, a computing system may be configured to determine a distance between text fields and control objects, between text fields and other text fields, and between control objects and other control objects. In some embodiments, determining a distance between text fields and/or control objects may comprise first drawing a bounding box around each of the text fields and/or control objects. In the example illustrated in FIG. 6, a user interface 600 includes a text field of "Last Name." A first bounding box 603 is drawn around the "Last Name" text field. The user interface 600 also includes three text entry control objects. Bounding boxes 606, 609, and 612, are drawn around the three text entry control objects.

A distance between a text field and a control object, between a text field and another text field, or between a control object and another control object may be determined by measuring a distance between the closest points of the bounding boxes surrounding each of the text fields and/or control objects. In the example user interface 600 of FIG. 6, a distance line 615 is drawn between the bounding box 603 surrounding the "Last Name" text field and the bounding box 612 of the lower-left text entry control object. Similarly, a distance line 618 is drawn between the bounding box 603 surrounding the "Last Name" text field and the bounding box 606 of the upper-right text entry control object and a distance line 621 is drawn between the bounding box 603 surrounding the "Last Name" text field and the bounding box 609 of the lower-right text entry control object.

It should be appreciated that the discussion of the computing system drawing boxes and virtual envelopes is provided for illustration purposes only. Such envelopes and boxes may be drawn logically without any visual aspect or may only be determined and not drawn. It should be appreciated that the same systems and methods as described herein may be performed without the necessity of drawing boxes or envelopes.

The systems and methods as disclosed herein may be performed by a computing device operated by a user. In some embodiments, a user interface displayed by the computing device, or another device in communication with the computing device, may enable a user to interact with the computing device. For example, as illustrated in FIGS. 7A-7C, a user interface may display results of the associations of text and control objects. Using such user interfaces, a user may be enabled to edit associations, create new associations, verify automatically created associations, etc. In some embodiments, a user may be enabled to upload an image, such as an image of a user interface, into an application configured to execute a method as described herein. The user may then be enabled by the application to have the application automatically identify text and control objects and determine an association between such text and control objects.

As illustrated in FIG. 7A, a user interface 700 may be uploaded into an application. The control objects and text may be identified and/or associated by the application. A user may select one of the control objects. In the example illustrated in FIG. 7A, a user has selected a text entry control object 703. Selecting a control object may present a modal window 706 or other type of graphical user interface. The window 706 may display information such as an automatically generated text association with the selected control object. For example, as illustrated in FIG. 7A, the text "Name" is associated with the selected control object 703. The user may also be presented, via the window 706, with an option to verify the text association, edit the text association, or make other changes. In this way, a user may be enabled to review the automatically determined text and control object associations. An "add to test" button may enable the user to save the text association in memory.

As illustrated in FIG. 7B, if a user seeks to edit an automatically created text association for a particular control object, the user may be presented, via the user interface, with options in addition to the automatically created text association. The user interface may display a number of options for text to associate with the selected control object. For example, as illustrated in FIG. 7B, the user interface displays a window 709 listing text fields of "Name," "[Last Name, First Name]," and "Frequently Asked Questions." Such text fields may be displayed based on a determination that the text fields may be associated with the selected control object. Users may be enabled to select one or more text to associate with the control object.

As illustrated in FIG. 7C, a user interface of an application may display to a user a confidence score indicating a degree of confidence that a particular control object is a control object of a particular type and is associated with a particular text field. For example, in the user interface of FIG. 7C, a window 712 displays a 97.4% degree of confidence as to the selected control object being a text box associated with text of "Name." In some embodiments, a user interface may display a table or list showing degrees of confidence between a selected control objects and a plurality of text fields.

While the above descriptions show user interfaces with a control object being selected, it should be appreciated a user may interact with an application and select a text field instead of or in addition to a control object and be presented with similar information.

Each of the methods or processes described herein are illustrated as a collection of blocks in a logical flow graph, which represent a sequence of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks may be combined in any order and/or in parallel to implement the processes. Additionally, any number of the described blocks may be optional and eliminated to implement the processes.

Figure 8:
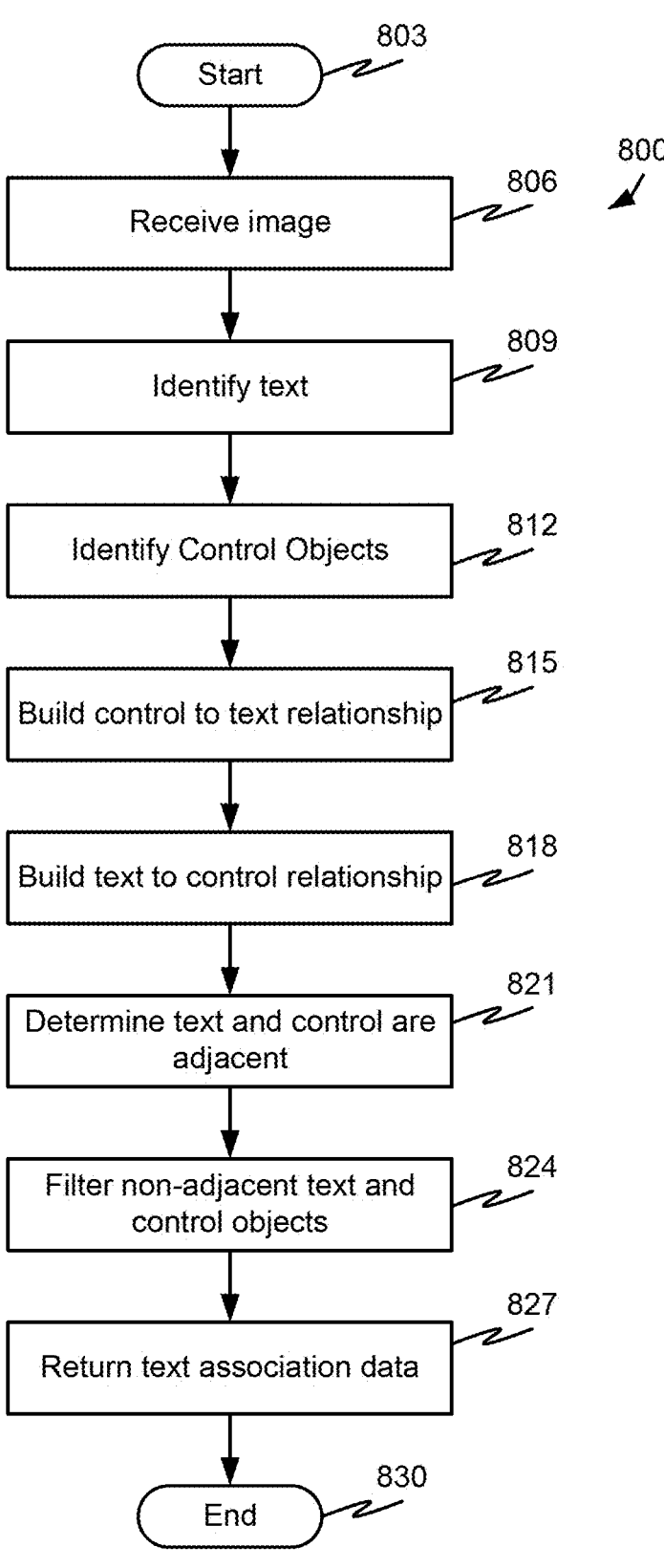
FIG. 8 is a flow chart of a method in accordance with one or more embodiments of the present disclosure.

FIG. 8 is a flow diagram of an embodiment for a process 800 of associated text and control objects for a given image. Illustratively, a computing system or device, such as a computing system 200 as illustrated in FIG. 2 which may execute or function as a data processing system 103 as illustrated in FIG. 1, and may be in communication with one or more servers 127, a network 124, and/or user devices 130 as illustrated in FIG. 1 may be used in executing the method or process 800 of FIG. 8. The computing system may implement one or more stored-program-controlled entities, such as a computer or microprocessor, which performs the method or process 800 of FIG. 8 and other processes described herein by executing program instructions stored in a computer-readable storage medium, such as a memory (i.e., a computer memory, a hard disk, and/or the like). Although the method described in FIG. 8 is shown in a specific order, one of skill in the art would recognize that the steps in FIG. 8 may be implemented in different orders and/or be implemented in a multi-threaded environment. Moreover, various steps may be omitted or added based on implementation.

The process 800 starts in step 803. In some embodiments, the process 800 may begin with a user, e.g., a user of a computing device, initiating the process 800 using the computing device. In some embodiments, the process 800 may be executed automatically, for example based on a time interval or detection of an occurrence, such as a change in a status or a detection of a new image being stored in a network location.

At 806, the computing device may receive an image. Receiving an image may comprise a user uploading an image via a user interface of an application executing on the computing device or another device in communication with the computing device. In some embodiments, the computing device may receive an image by polling a network location or downloading an image from a network location such as a website. In some embodiments, the computing device may receive an image by capturing a screenshot, taking a photograph, or otherwise collecting image data.

For example, as illustrated in FIG. 3A, a received image may be of a user interface 300 including text, images, and other visual data. In some embodiments, an input image may be created by a computing system processing another file, such as an HTML, file. An input image may be in the form of a JPEG, PNG, or other image filetype.

At 809, the computing device may automatically identify text within the input image. Identifying text within an input image may comprise executing an artificial intelligence system trained to recognize and interpret text or executing an OCR system. In some embodiments, an external system may be used to identify text within an image.

It should be appreciated text of any number of languages may be identified within an input image. In some embodiments, identifying text may comprise identifying a language of the text.

In some embodiments, the computing device may further be configured to determine whether text characters are related. For example, the computing system may be capable of determining portions of text are part of a text field or text block and whether some characters are not related to some other characters. In this way, text within an image may be organized based on position and relation.

At 812, the computing device may automatically identify control objects within the received image. In addition to being configured to identify text, the computing device may be configured to process an input image and determine whether the input image contains one or more control objects.

In some embodiments, a trained artificial intelligence system may be used to identify whether the input image contains one or more control objects. Such an artificial intelligence system may be trained based on input images of user interfaces containing different types of control objects such as buttons, text entry fields, switches, sliders, checkboxes, etc. For example, a rectangle found within an image may be detected and identified as either a text entry control object or a button control object. It should be appreciated that the computing system may not be required to determine a particular control object is of a particular type.

At 815, a control object to text relationship may be built. In some embodiments, building a control object to text relationship may comprise drawing a bounding box around each control object and each text block.

The computing system may be configured to identify distinct control objects and text blocks. In some embodiments, the computing system may draw bounding boxes around control objects and text blocks such as illustrated in FIG. 3B. While the bounding boxes illustrated in FIG. 3B are visually depicted for the purpose of illustration, it should be appreciated the bounding boxes may be simply logically determined by the computing system and no boxes may need to be drawn.

As described herein, the computing system may be configured to determine whether text is interrelated and to determine blocks of text are interrelated. For example, space between characters larger than a particular distance may represent the text is not part of a single phrase or sentence.

The computing system may next determine a distance between a particular control object and each text block. For example, as illustrated in FIG. 6, a distance between a control object and a text block may be determined by measuring a distance between closest points of bounding boxes of each. In some embodiments, the distance may be measured in pixels, though it should be appreciated the distances may instead be measured only as relative distances. For example, a shortest distance may be considered a distance of one unit and all other distances may be measured based on the unit.

The computing system may next create a list of text blocks for the control object and sort the list based on distance from each text block to the control object. For each control object to be analyzed, distances from the control object to each block of text may be determined to determine which text block is closest to each control object. In some embodiments, a user may request the computing device analyze the entire image or only one or more particular control objects.

At 818, a text to control object relationship may be built. In some embodiments, similar to building the control object to text relationship, building a text to control object relationship may comprise drawing a bounding box around each control object and each text block.

The computing system may next determine a distance between a particular text block and each control object and create a list of control objects for each text block and sort the list based on distance from each text block to the control object. For each text block to be analyzed, distances from the text block to each control object may be determined to determine which control object is closest to each text block. In some embodiments, a user may request the computing device analyze the entire image or only one or more particular text blocks.

At 821, the computing device may determine a text field is adjacent to a particular control object. Determining a text field is adjacent to a particular control object may in some embodiments comprise using a series of virtual envelopes as illustrated in FIGS. 5B-5E.

Each virtual envelope is drawn to include the text field in question and one particular control object. The particular control object for a given virtual envelope is the control object which is used by the computing device to determine the size of the virtual envelope. For example, as illustrated in FIG. 5B, the text field in question is the text "Last Name." The particular control object is the text entry field 504.

For each virtual envelope, the computing device may determine whether the virtual envelope contains or overlaps with any other control objects or text. That is whether the virtual envelope contains or overlaps with any text that is not the text field in question and/or any control object which is not the particular control object for that virtual envelope. For example, in the illustration of FIG. 5D, the virtual envelope 509 is drawn based on "Last Name" and the text entry field 510 but also includes a text field of "First Name." Similarly, in the illustration of FIG. 5E, the virtual envelope 512 is drawn based on "Last Name" and the text entry field 513 but also includes the text field of "First Name" and overlaps with the text entry field 504.

If no control objects or other text is contained within the virtual envelope other than the particular control object and the text in question, the text in question and the particular control object may be considered as adjacent.

If, on the other hand, the virtual envelope contains or overlaps with another control object, such as in FIG. 5E, the text in question and the particular control object may be considered as non-adjacent.

In some embodiments, the determination as to whether a text field is adjacent to a particular control object may not depend upon whether another text field is contained within or overlaps with a virtual envelope. In such an embodiment, the computing device may make the determination based only on whether a second control object overlaps with or is contained within the virtual envelope.

At 824, the computing device may filter any non-adjacent text and control objects. In general as assumption may be made by the computing system that any non-adjacent text and control objects are not associated. Based on this assumption, the computing system may proceed based on an assumption that each control object is associated with one or more adjacent text field and that each text field is associated with one adjacent control object.

At 827, the computing device may return data associated with text associations for the received image. In some embodiments, text within a control object, such as in the case of a labeled button or a text entry field with information displayed within, may automatically be considered as associated with said control object.

In some embodiments, a list of text fields may be created for each control object and a list of control objects may be created for each text field. For example, a list for a text field may contain only those control objects which are adjacent to the text field and the control objects may be sorted based on a distance from the text field.

Similarly, a list for a control object may contain only those text fields which are adjacent to the control object and the text fields may be sorted based on a distance from the control object.

If for a particular control object only one text field is adjacent, the computing device may determine the text field is associated with the control object. A determination that a text field is associated with a particular control object may be used to reduce lists of potential associations for other control objects. Similarly, if for a particular text field only one control object is adjacent, the computing device may determine the text field and control object are associated and that determination may be used to reduce lists of potential associations for other text fields.

For example, if a first text field (TF1) is the only text field adjacent to a first control block (CB1) but TF1 is also adjacent to a second control block (CB2) and CB2 is also adjacent to a second text field (TF2), the computing device may determine TF1 is most likely associated with CB1 and TF2 is most likely associated with CB2.

At 830, the process 800 may end. At the end of the process 800, the computing system may generate a list of control objects, their type, their locations and sizes, and an indication of which text fields are adjacent and/or associated. Such a list may also include a degree of confidence as to (1) whether the type of control object is correct; (2) whether the OCR results are correct, i.e., whether the text is correctly read by the computing system; (3) whether the control object is truly associated with each adjacent text field, and/or (4) some combination thereof.

In some embodiments, the process 800 may repeat if multiple images were received in step 806. For example, if a user selects or uploads a plurality of images. In some embodiments, such a process 800 may run in a background of a computer system being used by a user. The computer system may be configured to detect when a user interface is displayed on a screen of the computer system, capture an image of the user interface, and execute a method such as the process 800 to determine text and control object associations without interrupting the flow of the user.

In some embodiments, language of text within an image may be used to make decisions by the computing device. For example, if a user interface is written in English or another language read left to right, it may make sense for the text for a particular text entry field to be placed to the left of the text entry field. A simple method of translating the text to another language which is read right to left, such as Hebrew or Arabic, may result in confusion for users. Using a system as described herein, a computer system may be capable of identifying which text is associated with which control object and automatically rearranging such text and control objects based on language and associations. In this way, the computing system can take a form written in Spanish with control objects labeled using text to the left of the control objects and translate the text to Hebrew and place the text to the right of the control objects.

While the above-description relates to text and control objects, it should be appreciated that the same or similar functions may be used to associate text with images or images with control objects. IN this way, a computing system, using systems and methods as described herein, may be capable of associating text with images which may be used to automatically train an artificial intelligence system to identify contents of images without requiring human interaction.

Examples of the processors as described herein may include, but are not limited to, one or more of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

To avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus it should be appreciated that the components of the system can be combined into one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA®, or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, sub combinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Embodiments of the present disclosure include a computer-implemented method of associating text with a graphical user interface (GUI) object, the method comprising: identifying, by one or more processors, a GUI object; identifying, by the one or more processors, a text string; determining, by the one or more processors, a positional relationship between the GUI object and the text string; and based on the positional relationship between the GUI object and the text string, updating, by the one or more processors, a map with an indication associating the GUI object with the text string.

Aspects of the above method include wherein identifying the GUI object comprises processing an image with a neural network.

Aspects of the above method include the method further comprising determining, by the one or more processors, a confidence score indicating a degree of confidence as to whether the GUI object is associated with the text string.

Aspects of the above method include wherein determining the positional relationship between the GUI object and the text string comprises: determining, by the one or more processors, a distance between the text string and each of a plurality of GUI objects; and determining, by the one or more processors, a distance between the GUI object and each of a plurality of text strings.

Aspects of the above method include the method further comprising determining, by the one or more processors, the text string and the GUI object are adjacent.

Aspects of the above method include the method further comprising, in response to determining the text string and the GUI object are adjacent, building, by the one or more processors, a virtual envelope containing the text object and the GUI object.

Aspects of the above method include the method further comprising determining, by the one or more processors, the envelope does not overlap with one or more other GUI objects.

Aspects of the above method include the method further comprising determining, by the one or more processors, the text string is one of above the GUI object and below the GUI object.

Aspects of the above method include wherein the GUI object is identified within image data.

Embodiments of the present disclosure include a system for associating text with a graphical user interface (GUI) object, the system comprising: one or more processors; and a computer-readable medium having encoded thereon computer-executable instructions configured to cause the one or more processors to: identify a GUI object; identify a text string; determine a positional relationship between the GUI object and the text string; and based on the positional relationship between the GUI object and the text string, update a map with an indication associating the GUI object with the text string.

Aspects of the above system include wherein identifying the GUI object comprises processing an image with a neural network.

Aspects of the above system include wherein the instructions are further configured to cause the one or more processors to determine a confidence score indicating a degree of confidence as to whether the GUI object is associated with the text string.

Aspects of the above system include wherein determining the positional relationship between the GUI object and the text string comprises: determining a distance between the text string and each of a plurality of GUI objects; and determining a distance between the GUI object and each of a plurality of text strings.

Aspects of the above system include wherein the instructions are further configured to cause the one or more processors to determine the text string and the GUI object are adjacent.

Aspects of the above system include wherein the instructions are further configured to cause the one or more processors to, in response to determining the text string and the GUI object are adjacent, build a virtual envelope containing the text object and the GUI object.

Aspects of the above system include wherein the instructions are further configured to cause the one or more processors to determine the envelope does not overlap with one or more other GUI objects.

Aspects of the above system include wherein the instructions are further configured to cause the one or more processors to determine the text string is one of above the GUI object and below the GUI object.

Aspects of the above system include wherein the GUI object is identified within image data.

Embodiments of the present disclosure include a computer-readable storage device storing computer-executable instructions, wherein the instructions, when executed by one or more processors, cause the one or more processors to perform a method of associating text with a graphical user interface (GUI) object, the method comprising: identifying a GUI object; identifying a text string; determining a positional relationship between the GUI object and the text string; and based on the positional relationship between the GUI object and the text string, updating a map with an indication associating the GUI object with the text string.

Aspects of the above computer-readable storage device include wherein identifying the GUI object comprises processing an image with a neural network.

Aspects of the above computer-readable storage device include the method further comprising determining, by the one or more processors, a confidence score indicating a degree of confidence as to whether the GUI object is associated with the text string.

Aspects of the above computer-readable storage device include wherein determining the positional relationship between the GUI object and the text string comprises: determining, by the one or more processors, a distance between the text string and each of a plurality of GUI objects; and determining, by the one or more processors, a distance between the GUI object and each of a plurality of text strings.

Aspects of the above computer-readable storage device include the method further comprising determining, by the one or more processors, the text string and the GUI object are adjacent.

Aspects of the above computer-readable storage device include the method further comprising, in response to determining the text string and the GUI object are adjacent, building, by the one or more processors, a virtual envelope containing the text object and the GUI object.

Aspects of the above computer-readable storage device include the method further comprising determining, by the one or more processors, the envelope does not overlap with one or more other GUI objects.

Aspects of the above computer-readable storage device include the method further comprising determining, by the one or more processors, the text string is one of above the GUI object and below the GUI object.

Aspects of the above computer-readable storage device include wherein the GUI object is identified within image data.

What is claimed is:

1. A computer-implemented method of associating text with a graphical user interface (GUI) object, the method comprising:

identifying, by one or more processors, a GUI object;

identifying, by the one or more processors, a text string;

determining, by the one or more processors, a positional relationship between the GUI object and the text string;

based on the positional relationship between the GUI object and the text string, updating, by the one or more processors, a map with an indication associating the GUI object with the text string; and upon determining, by the one or more processors, that the text string and the GUI object are adjacent, building, by the one or more processors, a virtual envelope containing the text string and the GUI object, wherein the virtual envelope is sized such that at least one edge of the virtual envelope reaches an edge of the GUI object.

2. The method of claim 1, wherein identifying the GUI object comprises processing an image with a neural network.

3. The method of claim 1, further comprising determining, by the one or more processors, a confidence score indicating a degree of confidence as to whether the GUI object is associated with the text string.

4. The method of claim 1, wherein determining the positional relationship between the GUI object and the text string comprises:

determining, by the one or more processors, a distance between the text string and each of a plurality of GUI objects; and determining, by the one or more processors, a distance between the GUI object and each of a plurality of text strings.

5. The method of claim 1, further comprising determining, by the one or more processors, the virtual envelope does not overlap with one or more other GUI objects.

6. The method of claim 1, further comprising determining, by the one or more processors, the text string is one of above the GUI object and below the GUI object.

7. The method of claim 1, wherein the GUI object is identified within image data.

8. A system for associating text with a graphical user interface (GUI) object, the system comprising:

one or more processors; and a computer-readable medium having encoded thereon computer-executable instructions configured to cause the one or more processors to:

identify a GUI object;

identify a text string;

determine a positional relationship between the GUI object and the text string;

based on the positional relationship between the GUI object and the text string, update a map with an indication associating the GUI object with the text string; and determine, by the one or more processors, that the text string and the GUI object are adjacent, and build, by the one or more processors, a virtual envelope containing the text string and the GUI object, wherein the virtual envelope is sized such that at least one edge of the virtual envelope reaches an edge of the GUI object.

9. The system of claim 8, wherein identifying the GUI object comprises processing an image with a neural network.

10. The system of claim 8, wherein the instructions further cause the one or more processors to determine a confidence score indicating a degree of confidence as to whether the GUI object is associated with the text string.

11. The system of claim 8, wherein determining the positional relationship between the GUI object and the text string comprises:

determining a distance between the text string and each of a plurality of GUI objects; and determining a distance between the GUI object and each of a plurality of text strings.

12. The system of claim 8, wherein the instructions further cause the one or more processors to determine the virtual envelope does not overlap with one or more other GUI objects.

13. The system of claim 8, wherein the instructions further cause the one or more processors to determine the text string is one of above the GUI object and below the GUI object.

14. The system of claim 8, wherein the GUI object is identified within image data.

15. A computer-readable storage device storing computer-executable instructions, wherein the instructions, when executed by one or more processors, cause the one or more processors to perform a method of associating text with a graphical user interface (GUI) object, the method comprising:

identifying a GUI object;

identifying a text string;

determining a positional relationship between the GUI object and the text string;

based on the positional relationship between the GUI object and the text string, updating a map with an indication associating the GUI object with the text string; and upon determining that the text string and the GUI object are adjacent, building, by the one or more processors, a virtual envelope containing the text string and the GUI object, wherein the virtual envelope is sized such that at least one edge of the virtual envelope reaches an edge of the GUI object.

16. The computer-readable storage device of claim 15, wherein identifying the GUI object comprises processing an image with a neural network.

17. The computer-readable storage device of claim 15, further comprising determining a confidence score indicating a degree of confidence as to whether the GUI object is associated with the text string.

18. The computer-readable storage device of claim 15, wherein determining the positional relationship between the GUI object and the text string further comprises:

determining, by the one or more processors, a distance between the text string and each of a plurality of GUI objects; and determining, by the one or more processors, a distance between the GUI object and each of a plurality of text strings.

19. The computer-readable storage device of claim 15, further comprising determining the text string is one of above the GUI object and below the GUI object.

20. The computer-readable storage device of claim 15, wherein the GUI object is identified within image data.

* * * * *